US011949575B2

(12) United States Patent
Kurachi et al.

(10) Patent No.: US 11,949,575 B2
(45) Date of Patent: Apr. 2, 2024

(54) IN-VEHICLE COMMUNICATION SYSTEM, IN-VEHICLE COMMUNICATION DEVICE, AND TRANSMISSION CYCLE CALCULATION METHOD

(71) Applicants: NATIONAL UNIVERSITY CORPORATION TOKAI NATIONAL HIGHER EDUCATION AND RESEARCH SYSTEM, Nagoya (JP); AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Ryo Kurachi, Nagoya (JP); Hiroaki Takada, Nagoya (JP); Hiroshi Ueda, Yokkaichi (JP)

(73) Assignees: National University Corporation Tokai National Higher Education and Research System, Nagoya (JP); Sumitomo Wiring Systems, Ltd., Yokkaichi (JP); AutoNetworks Technologies, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 139 days.

(21) Appl. No.: 17/619,870

(22) PCT Filed: Jun. 3, 2020

(86) PCT No.: PCT/JP2020/021867
§ 371 (c)(1),
(2) Date: Dec. 16, 2021

(87) PCT Pub. No.: WO2020/255708
PCT Pub. Date: Dec. 24, 2020

(65) Prior Publication Data
US 2022/0360510 A1  Nov. 10, 2022

(30) Foreign Application Priority Data

Jun. 21, 2019  (JP) .................................. 2019-115712

(51) Int. Cl.
*H04L 12/801* (2013.01)
*G01C 21/32* (2006.01)
(Continued)

(52) U.S. Cl.
CPC .......... *H04L 43/0858* (2013.01); *H04L 12/40* (2013.01); *H04L 67/12* (2013.01);
(Continued)

(58) Field of Classification Search
CPC .............. H04L 12/40; H04L 12/40006; H04L 12/413; H04L 12/40026; H04L 47/34;
(Continued)

(56) References Cited

U.S. PATENT DOCUMENTS

| 10,567,401 B2* | 2/2020 | Yajima | .................... H04L 63/20 |
| 2014/0121901 A1* | 5/2014 | Shii | ....................... G06F 1/3278 |
| | | | 701/36 |

(Continued)

FOREIGN PATENT DOCUMENTS

| JP | 2002-084337 A | 3/2002 |
| JP | 2002084337 A * | 3/2002 |

(Continued)

OTHER PUBLICATIONS

International Search Report, Application No. PCT/JP2020/021867, dated Aug. 11, 2020. ISA/Japan Patent Office.

*Primary Examiner* — Edan Orgad
*Assistant Examiner* — Vanneilian Lalchinthang
(74) *Attorney, Agent, or Firm* — Honigman LLP

(57) ABSTRACT

An in-vehicle communication device on a transmitting side of a message includes: a delay time measuring unit measuring a delay time from when transmission of a message is first attempted to when the transmission of the message is started; and an assigning unit assigning the delay time measured by the delay time measuring unit to the message. An in-vehicle communication device on a receiving side of a message includes: a reception point acquisition unit acquiring a point in time when a message from the in-vehicle communication device on the transmitting side is received; a delay time acquisition unit acquiring a delay time assigned to the received message; and a calculation unit calculating a (Continued)

transmission cycle of each message based on a point in time acquired by the reception point acquisition unit and a delay time acquired by the delay time acquisition unit for each of two received messages.

8 Claims, 10 Drawing Sheets

(51) Int. Cl.
| | |
|---|---|
| *G08G 5/00* | (2006.01) |
| *H04L 12/40* | (2006.01) |
| *H04L 43/0852* | (2022.01) |
| *H04L 67/12* | (2022.01) |

(52) U.S. Cl.
CPC ........... *H04L 2012/40215* (2013.01); *H04L 2012/40273* (2013.01)

(58) Field of Classification Search
CPC ..... H04L 43/0858; H04L 43/16; H04L 67/12; H04L 69/28; H04L 2012/40215; H04L 2012/40273; G01C 11/02; G01C 21/005; G01S 17/89; G08G 5/0008

USPC ......................................................... 370/252
See application file for complete search history.

(56) References Cited

U.S. PATENT DOCUMENTS

| | | | |
|---|---|---|---|
| 2015/0295755 A1* | 10/2015 | Zhou | H04L 45/02 370/254 |
| 2015/0358351 A1* | 12/2015 | Otsuka | H04L 12/66 726/23 |
| 2017/0324675 A1* | 11/2017 | Takada | H04L 47/34 |
| 2018/0152364 A1* | 5/2018 | Lee | H04L 12/40143 |
| 2019/0139422 A1* | 5/2019 | Cheah | G01C 21/1654 |
| 2019/0263423 A1* | 8/2019 | Wakabayashi | B60W 30/09 |
| 2021/0126917 A1* | 4/2021 | Lin | H04L 12/40097 |

FOREIGN PATENT DOCUMENTS

| | | |
|---|---|---|
| JP | 2005-277896 A | 10/2005 |
| JP | 2010-258565 A | 11/2010 |
| JP | 2019054387 A | 4/2019 |

* cited by examiner

IN-VEHICLE COMMUNICATION SYSTEM, IN-VEHICLE COMMUNICATION DEVICE, AND TRANSMISSION CYCLE CALCULATION METHOD

CROSS-REFERENCE TO RELATED APPLICATIONS

This application is the U.S. national stage of PCT/JP2020/021867 filed on Jun. 3, 2020, which claims priority of Japanese Patent Application No. JP 2019-115712 filed on Jun. 21, 2019, the contents of which are incorporated herein.

TECHNICAL FIELD

The present disclosure relates to an in-vehicle communication system and an in-vehicle communication device for transmitting and receiving a message through a common communication line, and also to a transmission cycle calculation method for calculating the transmission cycle of a message transmitted periodically.

BACKGROUND

Conventionally, a plurality of devices, such as an ECU (Electronic Control Unit), are mounted in a vehicle. The plurality of in-vehicle devices are connected to each other through a communication line, exchange information by transmitting and receiving messages, and realize various functions of the vehicle in cooperation with each other. The communication standard of CAN (Controller Area Network) is widely adopted for communication in the vehicle.

Japanese Patent Laid-Open Publication No. 2005-277896 proposes an in-vehicle network expansion device that can be expected to efficiently arbitrate communication between communication lines when the communication lines of CAN arranged in a vehicle are divided into a plurality of systems. The in-vehicle network expansion device includes a circuit for arbitrating communication between the communication lines based on the priority assigned to a message when a communication collision occurs between the communication lines.

SUMMARY

Devices such as an ECU mounted in a vehicle often periodically transmit a message having predetermined information. By using this, a device on the side of receiving a message can calculate a transmission cycle for the received message and determine whether or not the received message is correct by determining whether or not the calculated transmission cycle is correct. However, message transmission by a plurality of in-vehicle devices may occur at the same time to cause message collision, and transmission of a low-priority message may be delayed due to arbitration processing. When the message transmission is delayed due to the arbitration processing, it is difficult for the device that receives the message to calculate the transmission cycle. This may lower the accuracy of determination regarding whether or not the message is correct based on the transmission cycle.

The present disclosure has been made in view of such circumstances, and an object thereof is to provide an in-vehicle communication system, an in-vehicle communication device, and a transmission cycle calculation method capable of accurately calculating the transmission cycle of a message.

An in-vehicle communication system according to this aspect is an in-vehicle communication system in which a plurality of in-vehicle communication devices connected to a common communication line transmit and receive messages through the communication line. An in-vehicle communication device on a transmitting side of a message includes: a delay time measuring unit that measures a delay time from a point in time when transmission of a message to be transmitted is first attempted to a point in time when the transmission of the message is started; and an assigning unit that assigns the delay time measured by the delay time measuring unit to the message. An in-vehicle communication device on a receiving side of a message includes: a reception point acquisition unit that acquires a point in time when a message from the in-vehicle communication device on the transmitting side is received; a delay time acquisition unit that acquires a delay time assigned to the received message; and a calculation unit that calculates a transmission cycle of each message based on a point in time acquired by the reception point acquisition unit and a delay time acquired by the delay time acquisition unit for each of two received messages.

Not only can the present application be realized as an in-vehicle communication device including such characteristic processing units, but also the present application can be realized as a communication method including such characteristic processes as steps or can be realized as a computer program causing a computer to execute such steps. The present application can be realized as a semiconductor integrated circuit that realizes some or all of these devices, or can be realized as another device or system including these devices.

Advantageous Effects

According to the above, it can be expected that the transmission cycle of a message is accurately calculated.

DETAILED DESCRIPTION OF PREFERRED EMBODIMENTS

Figure 1:
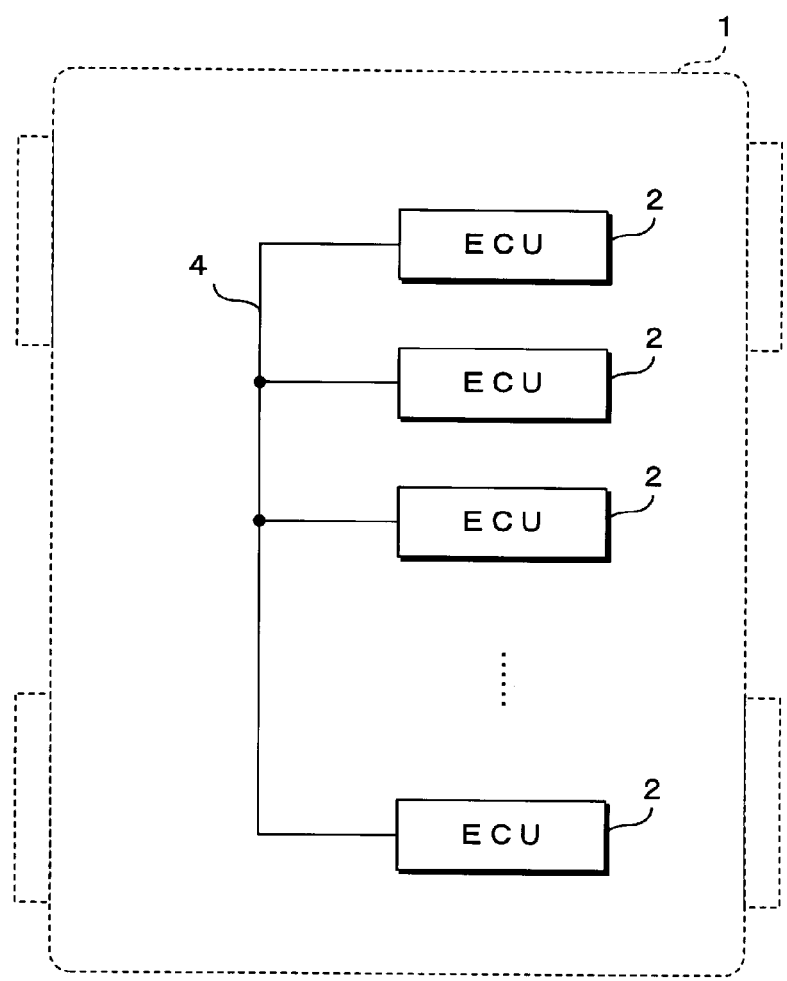
FIG. 1 is a block diagram showing the configuration of an in-vehicle communication system according to the present embodiment.

First, embodiments of the present disclosure will be listed and described. At least some of the embodiments described below may be arbitrarily combined.

(1) An in-vehicle communication system according to this aspect is an in-vehicle communication system in which a plurality of in-vehicle communication devices connected to a common communication line transmit and receive messages through the communication line. An in-vehicle communication device on a transmitting side of a message includes: a delay time measuring unit that measures a delay time from a point in time when transmission of a message to be transmitted is first attempted to a point in time when the transmission of the message is started; and an assigning unit that assigns the delay time measured by the delay time measuring unit to the message. An in-vehicle communication device on a receiving side of a message includes: a reception point acquisition unit that acquires a point in time when a message from the in-vehicle communication device on the transmitting side is received; a delay time acquisition unit that acquires a delay time assigned to the received message; and a calculation unit that calculates a transmission cycle of each message based on a point in time acquired by the reception point acquisition unit and a delay time acquired by the delay time acquisition unit for each of two received messages.

According to this aspect, a delay time from the point in time when the transmission of a message is first attempted to the point in time when the transmission of the message is actually started is assigned to the message by the in-vehicle communication device on the transmitting side. The message transmitted from the in-vehicle communication device on the transmitting side is received by the in-vehicle communication device on the receiving side connected to the common communication line. The in-vehicle communication device on the receiving side acquires the reception point in time of the received message, and acquires the delay time assigned to the received message. The in-vehicle communication device on the receiving side acquires the reception point in time and the delay time for each of the two messages received before and after in chronological order, and calculates the transmission cycle of the message based on the acquired information. Since the in-vehicle communication device on the transmitting side transmits a message with a delay time assigned thereto and the in-vehicle communication device on the receiving side acquires the delay time from the message and calculates the transmission cycle, the in-vehicle communication device on the receiving side can calculate the transmission cycle of the message in consideration of the delay of message transmission due to arbitration processing or the like in the in-vehicle communication device on the transmitting side. Therefore, the in-vehicle communication device on the receiving side can accurately calculate the transmission cycle of the message.

(2) It is preferable that the calculation unit calculates, as the transmission cycle, a time difference between a point in time that goes back by a delay time from a reception point in time of a message received earlier and a point in time that goes back by the delay time from a reception point in time of a message received later.

According to this aspect, the point in time that goes back from the reception time of the message by the delay time is a point in time when the transmission of the message is first attempted. Therefore, the in-vehicle communication device on the receiving side calculates a time difference between the point in time that goes back by the delay time from the reception point in time of the message received earlier and the point in time that goes back by the delay time from the reception point in time of the message received later, and sets the time difference as a transmission cycle of the message. Since the in-vehicle communication device on the receiving side can calculate the transmission cycle of the message based on the point in time when the in-vehicle communication device on the transmitting side first attempts to transmit the message, it is possible to accurately calculate the transmission cycle of the message.

(3) It is preferable that the in-vehicle communication device on the receiving side includes a periodic message determination unit that determines whether the received message is a periodically transmitted message or an aperiodically transmitted message based on the transmission cycle calculated by the calculation unit.

According to this aspect, based on the calculated transmission cycle of the message, the in-vehicle communication device on the receiving side determines whether the received message has been transmitted periodically or transmitted aperiodically. For example, each time a message is received, the in-vehicle communication device on the receiving side calculates a time difference in transmission point in time from the message received previously. When the calculated time difference falls within a margin of error with respect to the previously calculated transmission cycle, it can be determined that the received message is transmitted periodically. On the other hand, when the calculated time difference is a different value exceeding the margin of error with respect to the transmission cycle, the in-vehicle communication device on the receiving side can determine that the received message is transmitted aperiodically. The message determined to be aperiodic may be, for example, a message transmitted by event driving or an invalid message by an invalid device.

(4) It is preferable that plurality of in-vehicle communication devices include an in-vehicle communication device that has the delay time measuring unit and the assigning unit and an in-vehicle communication device that does not have the delay time measuring unit and the assigning unit.

According to this aspect, the plurality of in-vehicle communication devices connected to the common communication line include an in-vehicle communication device that transmits a message with a delay time assigned thereto and an in-vehicle communication device that transmits a message without assigning a delay time. That is, in the in-vehicle communication system, a message with a delay time and a message without a delay time can be mixed. A function of assigning a delay time to an in-vehicle communication device, which is required to accurately determine the transmission cycle of a message, may be added to the in-vehicle communication system having a conventional configuration that does not assign a delay time. Therefore, it is possible to easily introduce the configuration of the in-vehicle communication system of this aspect into a conventional vehicle.

(5) It is preferable that identification information for identifying the message is added to the message and that the in-vehicle communication device on the receiving side includes an assignment determination unit that determines whether or not a delay time is assigned to the message based on identification information added to the received message.

According to this aspect, identification information for identifying the message is added to the message transmitted and received by the in-vehicle communication device. The message identification information can be, for example, CAN-ID in the CAN communication standard. However, the communication of this aspect is not limited to the communication standard of CAN, and various communication standards such as FlexRay or Ethernet (registered trademark) can be adopted. The in-vehicle communication device on the receiving side determines whether or not a delay time is assigned to the message based on the identification information of the received message. As a result, even when a message with a delay time and a message without a delay time are mixed, the in-vehicle communication device on the receiving side can calculate the transmission cycle of the message.

(6) An in-vehicle communication device according to this aspect is an in-vehicle communication device that is connected to a common communication line together with other in-vehicle communication devices and transmits and receives a message through the communication line. The in-vehicle communication device includes: a reception unit that receives a message with a delay time from a point in time when transmission of a message to be transmitted is first attempted to a point in time when the transmission of the message is started; a reception point acquisition unit that acquires a point in time when the reception unit receives the message; a delay time acquisition unit that acquires a delay time assigned to the received message; and a calculation unit that calculates a transmission cycle of each message based on a point in time acquired by the reception point acquisition unit and a delay time acquired by the delay time acquisition unit for each of two received messages.

According to this aspect, as in the aspect (1), it is possible to accurately calculate the transmission cycle of the message.

(7) A transmission cycle calculation method according to this aspect is a transmission cycle calculation method for calculating a transmission cycle of each message transmitted and received through a common communication line by a plurality of in-vehicle communication devices connected to the common communication line. The transmission cycle calculation method includes: measuring a delay time from a point in time when transmission of a message to be transmitted is first attempted to a point in time when the transmission of the message is started and assigning the measured delay time to the message by an in-vehicle communication device on a transmitting side of a message; and acquiring a point in time when a message from the in-vehicle communication device on the transmitting side is received, acquiring a delay time assigned to the received message, and calculating a transmission cycle of each message based on a point in time and a delay time acquired for each of two received messages by an in-vehicle communication device on a receiving side of a message.

According to this aspect, as in the aspect (1), it is possible to accurately calculate the transmission cycle of the message.

Specific examples of in-vehicle communication systems according to embodiments of the present disclosure will be described below with reference to the diagrams. In addition, the present disclosure is not limited to these examples but is defined by the claims, and is intended to include all modifications within the meaning and scope equivalent to the claims.

System Configuration

FIG. 1 is a block diagram showing the configuration of an in-vehicle communication system according to the present embodiment. The in-vehicle communication system according to the present embodiment is configured to include a plurality of ECUs 2 mounted in a vehicle 1. Each of the plurality of ECUs 2 is connected to a communication line 4 arranged in the vehicle 1, and can transmit and receive a message through the communication line 4. In addition, in the present embodiment, the plurality of ECUs 2 transmit and receive messages according to the CAN communication standard. The communication line 4 is called a CAN bus, and several to a dozen or more ECUs 2 can be connected to one communication line 4. A plurality of communication lines 4 may be provided in the vehicle 1. In this case, a device such as a gateway that relays a message between the communication lines 4 is mounted in the vehicle. In addition, the number of ECUs 2 included in the in-vehicle communication system, the number of communication lines 4, the connection mode of each devices, the network configuration, and the like are not limited to those shown in the diagrams.

As the ECU 2, for example, various ECUs such as an ECU that controls the operation of the engine of the vehicle 1, an ECU that controls locking/unlocking of the door, an ECU that controls ON/OFF of the light, an ECU that controls the operation of the airbag, and an ECU that controls the operation of an ABS (Antilock Brake System). In addition, in the present embodiment, the ECU 2 is mentioned as an in-vehicle communication device for transmitting and receiving a message through the communication line 4, but the in-vehicle communication device is not limited thereto.

In a message according to the CAN communication standard, identification information called CANID is stored in the head area of the message called an arbitration field. The CANID is information indicating the type of data included in the message and the priority of the message. The smaller the value of CANID, the higher the priority of the message. When a plurality of ECUs 2 attempt to transmit messages to the communication line 4 at the same time, in the CAN communication standard, arbitration processing based on the CANID value stored in the arbitration field of the message is performed by each ECU 2. As a result of the arbitration processing, one message with the highest priority is allowed to be transmitted, and the other messages need to wait for transmission. The CANID is a value determined by the designer at the design stage or the like of the vehicle 1, the in-vehicle communication system, or the ECU 2.

In the in-vehicle communication system according to the present embodiment, the ECU 2 adds the information of delay time caused by arbitration processing to the message and transmits the message. The ECU 2 that has received the message can calculate the time (point in time) at which the ECU 2 as a transmission source has attempted to transmit the message first, that is, transmission time (transmission point in time) at which the ECU 2 as a transmission source could transmit the message if there is no delay due to arbitration processing, based on the message reception time (reception point in time) and the delay time assigned to the message.

In addition, in the present embodiment, each ECU 2 repeatedly transmits a message at a predetermined cycle. The transmission cycle is set in advance, for example, for each ECU 2 or for each message type (that is, for each CANID). The ECU 2 that has received the message calculates a time difference from the previous message transmission time to the current message transmission time based on the reception time and delay time of the received message and the reception time and delay time of the previous received message having the same CANID as the received message. The calculation of the time difference corresponds to the process of calculating the transmission cycle of the message.

The ECU 2 according to the present embodiment calculates the transmission cycle of the message each time a message is received. The ECU 2 compares the calculation result of the current transmission cycle with the calculation result of the previous transmission cycle, and determines that the current received message is not the expected periodic message when the current transmission cycle is significantly different from the previous transmission cycle. In the present embodiment, the message determined by the ECU 2 to be not a periodic message is regarded as an invalid message and discarded. Here, the aperiodic message may be processed as a valid message, such as an event message.

Figure 2:
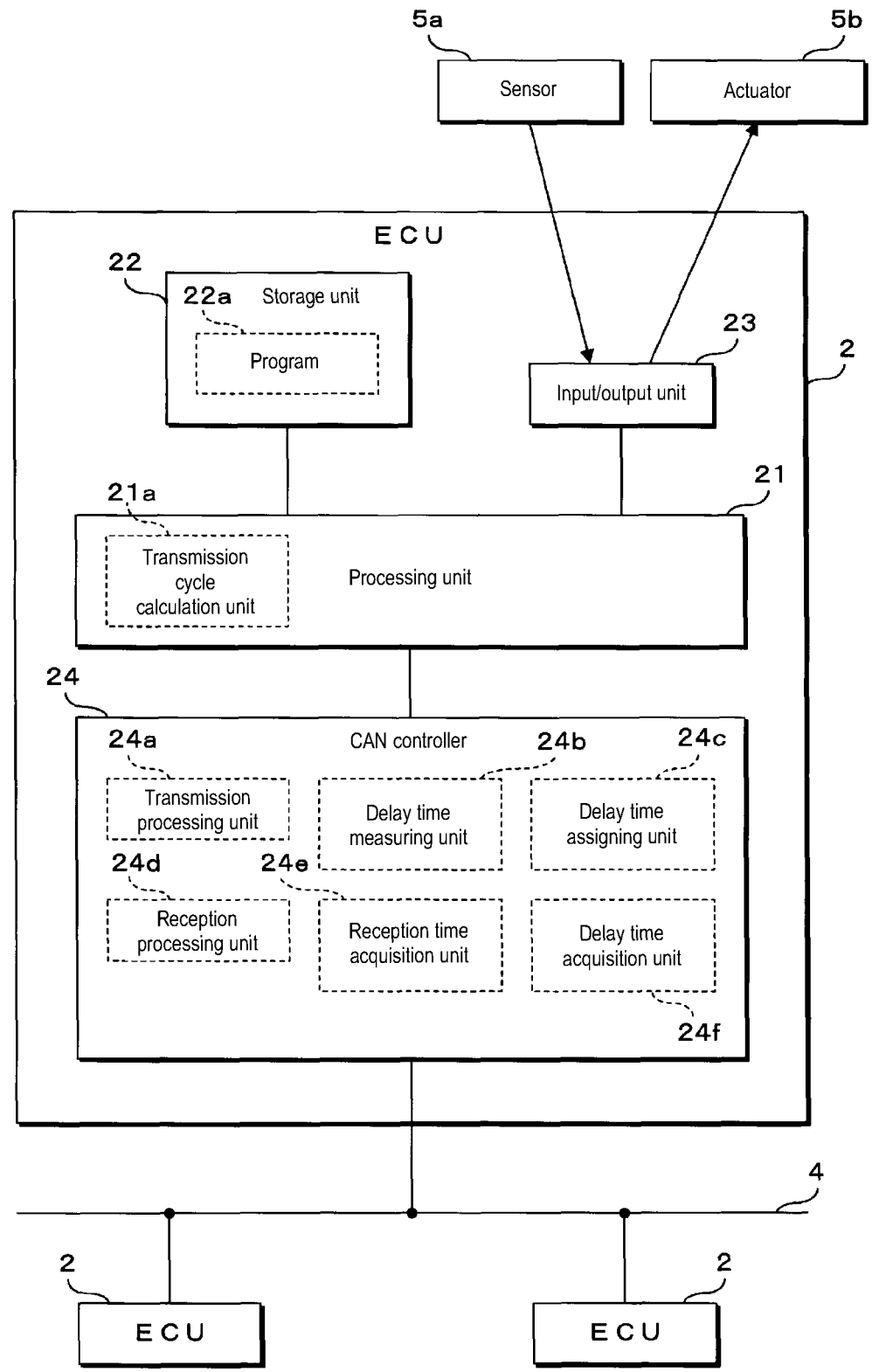
FIG. 2 is a block diagram showing the configuration of an ECU according to the present embodiment.

FIG. 2 is a block diagram showing the configuration of the ECU 2 according to the present embodiment. The ECU 2 according to the present embodiment is configured to include a processing unit (processor) 21, a storage unit (storage) 22, an input/output unit (I/O) 23, and a CAN controller 24. The processing unit 21 reads and executes a program 22*a* stored in the storage unit 22 to perform various processes such as control processing of the vehicle 1. When it is necessary to transmit a message to another ECU 2 in control processing or the like, the processing unit 21 sends a message to be transmitted to the CAN controller 24 and instructs the CAN controller 24 to transmit the message. In addition, in the present embodiment, the processing unit 21 performs a process of calculating the transmission cycle of the received message.

The storage unit 22 is configured by using a non-volatile memory element, such as a flash memory or an EEPROM (Electrically Erasable Programmable Read Only Memory). The storage unit 22 stores various programs executed by the processing unit 21 and various kinds of data required for the processing of the processing unit 21. In the present embodiment, the storage unit 22 stores the program 22*a* executed by the processing unit 21.

The program 22*a* may be written into the storage unit 22 at the manufacturing stage of the ECU 2, for example. For example, the program 22*a* distributed by a remote server device or the like may be acquired by the ECU 2 through communication. For example, the ECU 2 may read out the program 22*a* recorded on a recording medium, such as a memory card or an optical disk, and store the program 22*a* in the storage unit 22. For example, the program 22*a* recorded on a recording medium may be read out by a writing device and written into the storage unit 22 of the ECU 2. The program 22*a* may be provided in the form of distribution through a network, or may be provided in a form recorded on a recording medium.

Devices, such as a sensor 5*a* and an actuator 5*b*, are connected to the input/output unit 23 through a signal line or the like. The input/output unit 23 samples and acquires a signal input from an input device, such as the sensor 5*a*, and transmits the acquired information to the processing unit 21. In addition, when a control command for a control target device, such as the actuator 5*b*, is given from the processing unit 21, the input/output unit 23 outputs a control signal corresponding to the control command. The ECU 2 does not need to perform both input and output, and may be configured to perform only input or only output, and may be configured to perform neither input nor output.

The CAN controller 24 performs processing relevant to the transmission and reception of a message through the communication line 4. The CAN controller 24 can be configured as, for example, one IC (Integrated Circuit). The CAN controller 24 is connected to the communication line 4 arranged in the vehicle 1, and transmits and receives a message to and from another ECU 2 through the communication line 4 according to the CAN communication standard. The CAN controller 24 transmits a message to another ECU 2 by converting a transmission message given from the processing unit 21 into an electrical signal corresponding to the CAN communication standard and outputting the electrical signal to the communication line 4. The CAN controller 24 receives a message from another ECU 2 by sampling and acquiring the potential of the communication line 4, and sends the received message to the processing unit 21.

In addition, the CAN controller 24 according to the present embodiment includes a transmission processing unit 24*a*, a delay time measuring unit 24*b*, a delay time assigning unit 24*c*, a reception processing unit 24*d*, a reception time acquisition unit 24*e*, and a delay time acquisition unit 24*f*. When a message to be transmitted and a transmission instruction are given from the processing unit 21, the transmission processing unit 24*a* performs a process of transmitting the message to another ECU 2 by outputting the message to the communication line 4. In addition, the transmission processing unit 24*a* performs arbitration processing when the message transmissions of other ECUs 2 are performed at the same time. The transmission processing unit 24*a* transmits a message when the transmission right is acquired by the arbitration processing.

The delay time measuring unit 24*b* performs a process of measuring the time during which the message transmission is delayed because the transmission right cannot be acquired by the arbitration processing. The delay time measuring unit 24*b* measures the delay time by using a counter. For example, the delay time measuring unit 24*b* starts the time measurement of the counter when a message to be transmitted and a transmission instruction are given from the processing unit 21. Thereafter, the delay time measuring unit 24*b* acquires the value of the counter at the point in time when the transmission right is acquired by the arbitration processing, and sets the value as the delay time. For example, when the value of the counter is 100 and the clock period for operating the counter is 1 μsec, the actual delay time is 100 μsec. In the present embodiment, it is assumed that the value of the clock period of the counter is known to the plurality of ECUs 2, and the value of this counter is treated as the delay time.

The delay time assigning unit 24*c* performs a process of assigning the delay time (counter value corresponding to the delay time) measured by the delay time measuring unit 24*b* to the transmitted message. The delay time assigning unit 24*c* stores the delay time in a part of the data field of the message according to the communication standard of CAN, for example.

The reception processing unit 24*d* performs a process of receiving a message transmitted from another ECU 2. The reception processing unit 24*d* receives a message by repeatedly sampling the potential of the communication line 4, and sends the received message to the processing unit 21.

The reception time acquisition unit 24*e* performs a process of acquiring the time when the reception processing unit 24*d* receives a message from another ECU 2. In the present embodiment, the CAN controller 24 has a timer function for measuring the current time. The time measured by the CAN controller 24 may be an absolute time shared with other devices, or may be a relative time used only by its own device. For example, the timer function is realized by a counter, and by operating the counter at the same time as the CAN controller 24 is started, the relative time from the start can be measured by the counter. The reception time acquisition unit 24e acquires the reception time of the message by acquiring the value of the timer function counter at the timing when the message is received.

The delay time acquisition unit 24f performs a process of acquiring information of the delay time assigned to the received message. In the present embodiment, the delay time information is stored in a part of the data field of the message. The delay time acquisition unit 24f extracts and acquires the delay time information from a predetermined location in the data field of the received message.

The CAN controller 24 transmits information, such as the content of the message received by the reception processing unit 24d, the reception time acquired by the reception time acquisition unit 24e, and the delay time acquired by the delay time acquisition unit 24f, to the processing unit 21.

In the present embodiment, a transmission cycle calculation unit 21a is provided in the processing unit 21. The transmission cycle calculation unit 21a is a software-like functional block realized by executing the program 22a stored in the storage unit 22 with the processing unit 21. However, the transmission cycle calculation unit 21a may be realized as a hardware-like functional block.

As described above, each time a message is received, the CAN controller 24 transmits information, such as the content of the message, the reception time, and the delay time, to the processing unit 21. Based on the information transmitted from the CAN controller 24, the transmission cycle calculation unit 21a of the processing unit 21 performs a process of calculating the transmission cycle of the message by calculating the time difference between the received message and the previously received message. Therefore, the transmission cycle calculation unit 21a stores the information of the reception time and the delay time (or may be information of the transmission time of the message calculated from the reception time and the delay time) of the previously received message. The transmission cycle calculation unit 21a calculates the transmission cycle of the message based on the reception time and delay time of the previous received message and the reception time and delay time of the current received message.

For example, it is assumed that a certain ECU α periodically transmits a message Mα and the transmission cycle of the message is Tα. That is, in the ECU α, a transmission message and a transmission instruction are given from the processing unit 21 to the CAN controller 24 in a cycle Tα. When an ECU β receives the message Ma transmitted from the ECU α, the sequence of the reception time of messages Mα0, Mα1, ..., Mαn consecutively received by the ECU β is tβ={tβ0, tβ1, ..., tβn}. At this time, the sequence of delay time corresponding to each reception time is d={d0, d1, ..., dn}.

In this case, with respect to the message Mα0 received by the ECU β at the reception time tβ0, the time (message generation time) tα0 at which a transmission instruction is given by the ECU α can be calculated by using the following Equation (1).

$$t\alpha 0 = t\beta 0 - d0 \qquad (1)$$

Therefore, the transmission interval Tβ between the two consecutive messages Mα0 and Mα1 can be calculated by using the following Equation (2).

$$T\beta = (t\beta 1 - d1) - (t\beta 0 - d0) \qquad (2)$$

The transmission interval Tβ calculated by this Equation (2) corresponds to the transmission cycle Tα of the message M by the ECU α. However, since there are errors in the clock signals of the ECU α and the ECU β, there may be differences due to these errors in Tα and Tβ. That is, Tβ≈Tα. In addition, the CAN controller 24 may include the transmission cycle calculation unit 21a. In this case, the CAN controller 24 transmits the calculation result of the transmission cycle to the processing unit 21.

The processing unit 21 can determine whether or not the received message is correct based on the transmission cycle calculated by the transmission cycle calculation unit 21a. In addition, in the present embodiment, the processing unit 21 calculates the transmission cycle of the received message, but the CAN controller 24 may calculate the transmission cycle, and the CAN controller 24 may transmit the calculation result to the processing unit 21. In this case, the CAN controller 24 may determine whether or not the received message is correct based on the calculated transmission cycle.

Transmission Cycle Calculation Method

Figure 3:
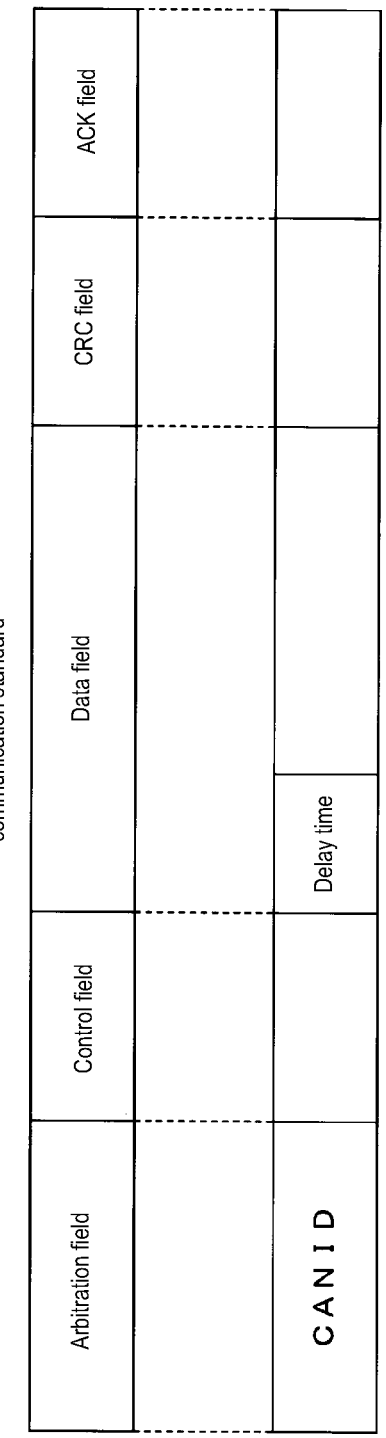
FIG. 3 is a schematic diagram for explaining the configuration of a message transmitted from an ECU in the in-vehicle communication system according to the present embodiment.

FIG. 3 is a schematic diagram for explaining the configuration of a message transmitted from the ECU 2 in the in-vehicle communication system according to the present embodiment. The message according to the CAN communication standard includes an arbitration field, a control field, a data field, a CRC (Cyclic Redundancy Check) field, and an ACK field. In the message according to the present embodiment, the CANID is stored in the arbitration field, and the delay time information is stored in a part of the data field.

According to the CAN communication standard, the size of the data field of a message is up to 8 bytes. In 8 bytes, the size of the area for storing the delay time can be, for example, 2 bytes to 4 bytes. The size of the delay time is determined in advance at the design stage of the in-vehicle communication system or the like, for example, based on the maximum delay time. Assuming that the period of the clock signal for operating the counter for measuring the delay time is, for example, 2 μsec, the maximum delay time of 2 bytes is about 130 msec, the maximum delay time of 3 bytes is about 33 seconds, and the maximum delay time of 4 bytes is about 67 seconds.

The CAN controller 24 starts the transmission of the message by outputting the message given from the processing unit 21 to the communication line 4 in order from the MSB (Most Significant Bit) side, that is, the arbitration field side. Upon starting the transmission of the message, the CAN controller 24 starts measuring the delay time by the counter. The arbitration processing is performed from the start of message transmission to the completion of transmission of the arbitration field, and the result of the arbitration processing, that is, whether or not there is a message transmission right, is determined at the point in time when the transmission of the final bit of the arbitration field is completed. When the acquisition of the transmission right is determined by the arbitration processing, the CAN controller 24 acquires the delay time measured by the counter and stores the acquired delay time in a predetermined location of the data field. Thereafter, the CAN controller 24 transmits the control field, the data field, the CRC field, and the ACK field in this order, and completes the message transmission.

Figure 4:
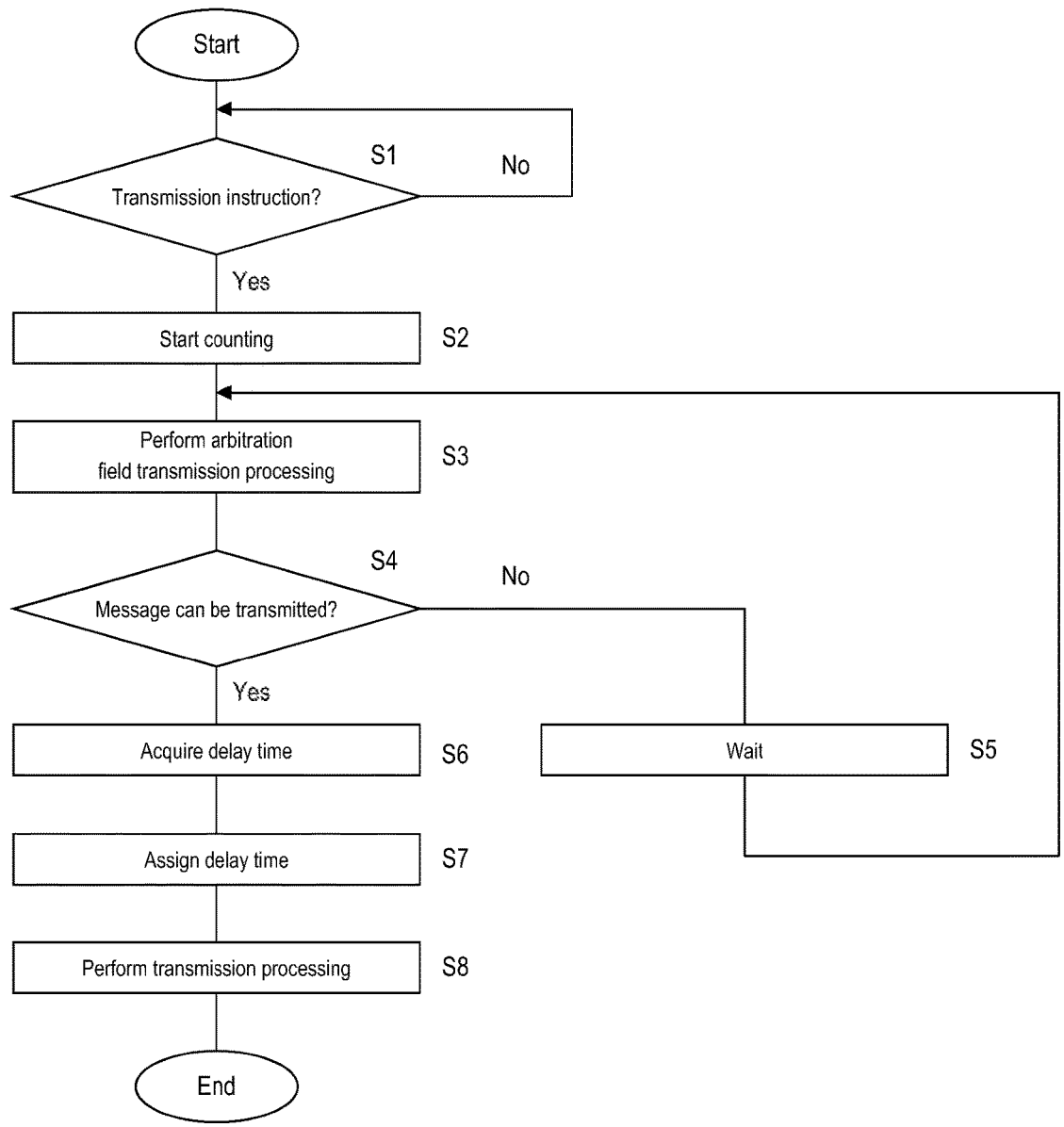
FIG. 4 is a flowchart showing the procedure of a message transmission process performed by a CAN controller according to the present embodiment.

FIG. 4 is a flowchart showing the procedure of a message transmission process performed by the CAN controller 24 according to the present embodiment. The transmission processing unit 24a of the CAN controller 24 according to the present embodiment determines whether or not a transmission instruction has been given from the processing unit 21 together with a message to be transmitted (step S1). If no transmission instruction is given (S1: NO), the transmission processing unit 24a waits until the transmission instruction is given. If a transmission instruction is given (S1: YES), the delay time measuring unit 24b of the CAN controller 24 starts counting the delay time by the counter (step S2).

The transmission processing unit 24a starts transmission from the beginning of the transmission message, and performs arbitration field transmission processing first (step S3). At this time, the transmission processing unit 24a performs arbitration processing between the ECU 2 and another ECU 2, and the presence or absence of the transmission right is determined by transmitting the final bit of the arbitration field. The transmission processing unit 24a determines whether or not it is possible to transmit its own message based on the result of the arbitration processing (step S4). If the message cannot be transmitted (S4: NO), the transmission processing unit 24a waits until the message transmission by another ECU 2 ends (step S5), and the process returns to step S3 to attempt the message transmission again.

If the message can be transmitted (S4: YES), the delay time measuring unit 24b acquires the delay time counted by the counter (step S6). The delay time assigning unit 24c of the CAN controller 24 assigns the delay time acquired in step S6 to a predetermined location in the data field of the transmitted message (step S7). The transmission processing unit 24a performs transmission processing for the control field and subsequent fields of the transmission message (step S8), and ends the message transmission process.

Figure 5:
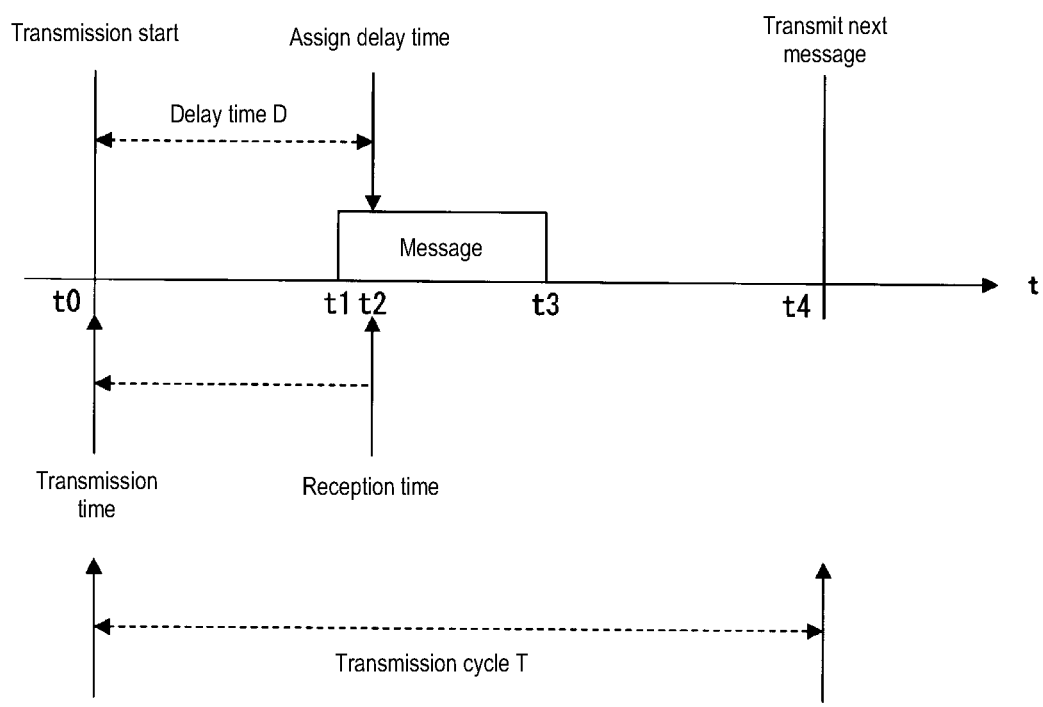
FIG. 5 is a schematic diagram for explaining a transmission cycle calculation method according to the present embodiment.
Figure 6:
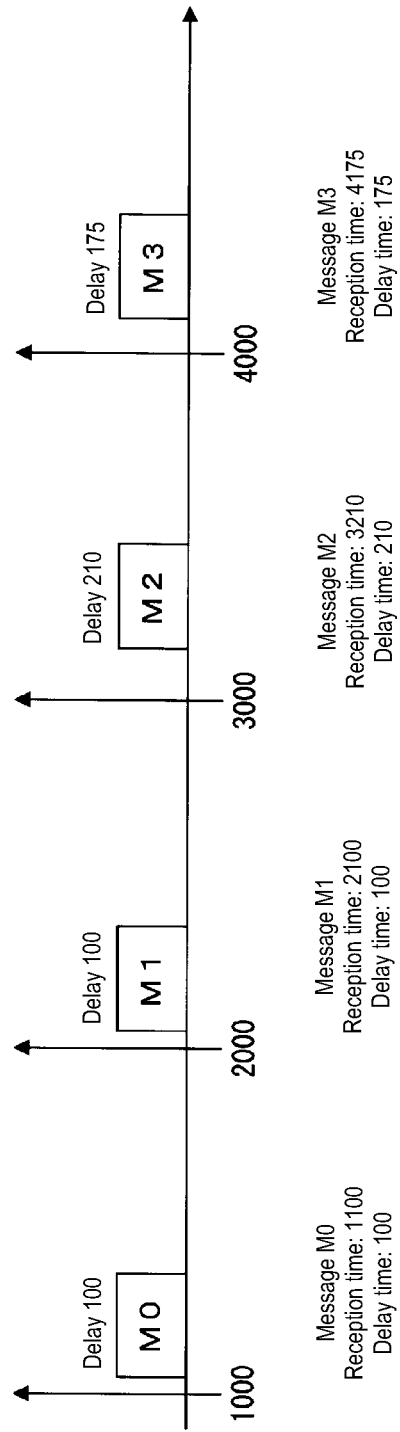
FIG. 6 is a schematic diagram for explaining a transmission cycle calculation method according to the present embodiment.

FIGS. 5 and 6 are schematic diagrams for explaining a transmission cycle calculation method according to the present embodiment. FIG. 5 shows a relationship between time (point in time) and time for one message. In the example shown in FIG. 5, the point in time when the CAN controller 24 first attempts to transmit a message according to a transmission instruction from the processing unit 21 is the transmission start time t0. In this example, the transmission of the message is made to stand by due to the message transmission of another ECU 2, and the transmission of the message is attempted again at the subsequent time t1. The transmission right of the message is determined at time t2 when the final bit of the arbitration field is transmitted, and the delay time D at this point in time is assigned to a predetermined location in the data field of the message. The CAN controller 24 transmits the remaining part of the message and completes the transmission of the message at time t3. Thereafter, at time t4 at which the transmission cycle T of the message has passed from the message transmission start time t0, the CAN controller 24 attempts to transmit the next message.

The CAN controller 24 of the ECU 2 that receives the message sets the time t2 at which the transmission of the message is determined by the arbitration processing as the reception time of the message. The CAN controller 24 completes the reception of the message at the subsequent time t3, and acquires the delay time D from a predetermined location in the data field of the received message. The CAN controller 24 transmits information of the message reception time and the delay time to the processing unit 21. The processing unit 21 can calculate the time t0 that goes back from the message reception time t2 by the delay time D as the message transmission time t0. Each time the CAN controller 24 receives a message, the processing unit 21 calculates the message transmission time in the same manner and calculates the time difference between the transmission times of two consecutive received messages in chronological order, thereby being able to calculate the transmission cycle T of the message.

In addition, for the delay time D assigned to the message by the CAN controller 24 of the ECU 2 on the transmitting side, the length of the message to be transmitted may be calculated in advance, and the time until the time t3 when the transmission of the message is completed, that is, the time corresponding to (t3−t0), may be set as the delay time D. In this case, the ECU 2 on the receiving side sets the point in time when the message reception is completed as a message reception time.

FIG. 6 shows examples of reception time and delay time for four messages M0 to M3. In addition, the reception time, the delay time, and the like in this diagram are shown by using counter values measured by a timer function counter provided in the CAN controller 24 of the ECU 2 that receives the message. For example, the message M0 is received at the reception time 1100, and 100 is given as a delay time. Similarly, the message M1 is received at the reception time 2100, and 100 is given as a delay time. The message M2 is received at the reception time 3210, and 210 is given as a delay time. The message M3 is received at the reception time 4175, and 175 is given as a delay time.

The ECU 2 that has received the message can calculate the time that goes back from the message reception time by the delay time as a transmission time. In this example, the transmission time of the message M0 is 1000, the transmission time of the message M1 is 2000, the transmission time of the message M2 is 3000, and the transmission time of the message M3 is 4000. The ECU 2 calculates the time difference between the transmission times of two consecutive messages in chronological order. In this example, the time difference between the transmission times of the messages M0 and M1 is 1000, the time difference between the transmission times of the messages M1 and M2 is 1000, and the time difference between the transmission times of the messages M2 and M3 is 1000. Therefore, the ECU 2 can determine that the transmission cycle of the message is 1000.

Figure 7:
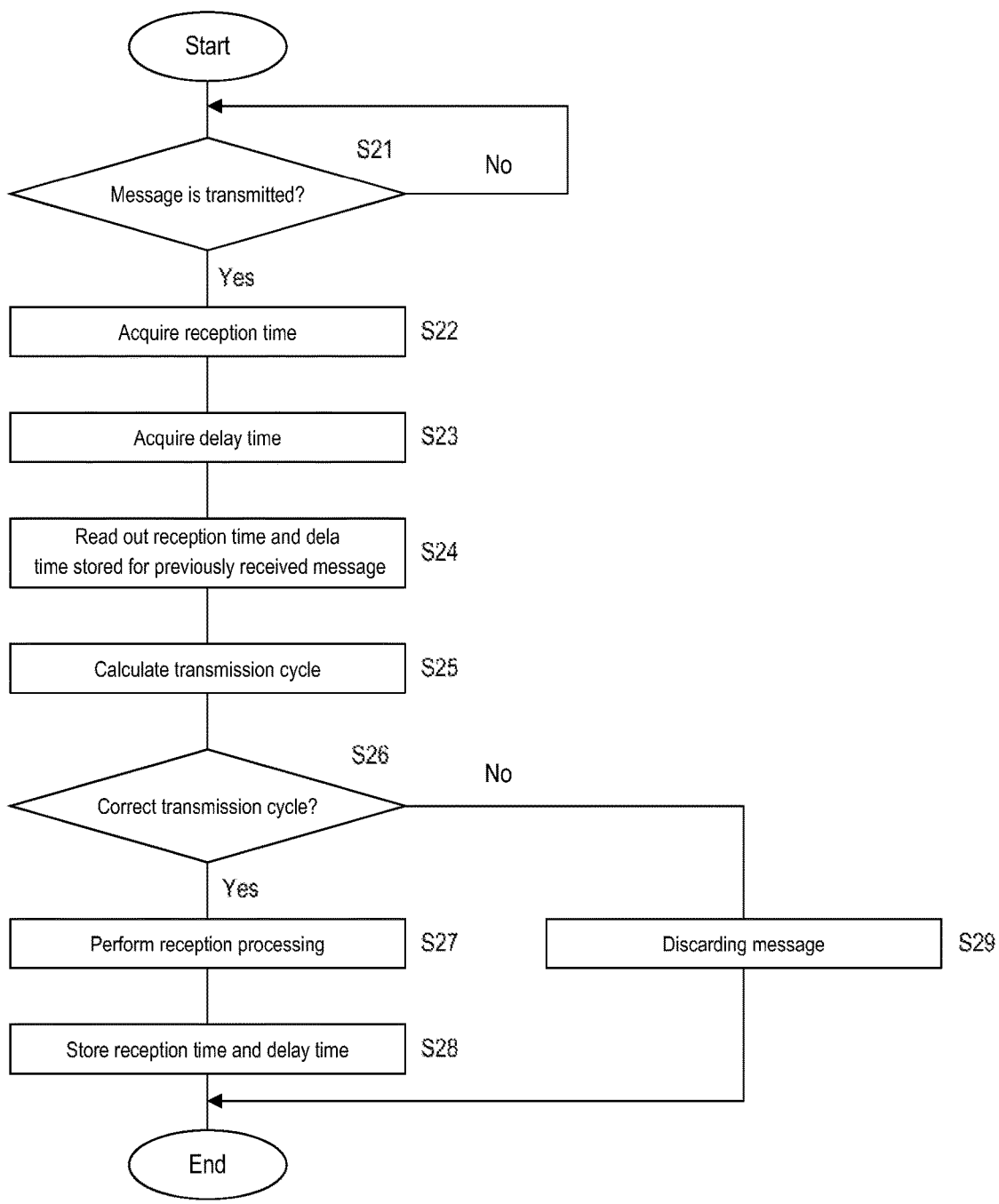
FIG. 7 is a flowchart showing the procedure of a transmission cycle calculation process performed by the CAN controller according to the present embodiment.

FIG. 7 is a flowchart showing the procedure of a transmission cycle calculation process performed by the ECU 2 according to the present embodiment. The reception processing unit 24d of the CAN controller 24 of the ECU 2 according to the present embodiment determines whether or not another ECU 2 has transmitted a message to the communication line 4 (step S21). If no message is transmitted (S21: NO), the reception processing unit 24d waits until another ECU 2 transmits a message.

When a message is transmitted from another ECU 2 (S21: YES), the reception time acquisition unit 24e of the CAN controller 24 acquires the reception time of the message based on the timer function of the CAN controller 24 (step S22). At this time, the reception time acquisition unit 24e acquires the point in time when the reception of the message up to the arbitration field is completed as a reception time. Thereafter, the delay time acquisition unit 24f of the CAN controller 24 acquires the delay time assigned to a predetermined location in the data field of the received message (step S23). The information of the reception time and the delay time acquired by the CAN controller 24 is given to the processing unit 21. The transmission cycle calculation unit 21a of the processing unit 21 reads out the information of the reception time and the delay time stored for the previously received message (step S24). The transmission cycle calculation unit 21a calculates the transmission cycle of the message based on the reception time and the delay time of the previous received message and the reception time and the delay time of the current received message (step S25).

The processing unit 21 determines whether or not the transmission cycle calculated in step S25 is a correct transmission cycle (step S26). For example, the processing unit 21 has information, such as a table in which a valid transmission cycle is set in advance for the CANID of a message. By determining whether or not the calculated transmission cycle matches the valid transmission cycle stored in the table or the like or determining whether or not the difference between the calculated transmission cycle and the valid transmission cycle is within a threshold value, the processing unit 21 can determine whether or not the calculated transmission cycle is valid. In addition, for example, by comparing the previously calculated transmission cycle with the transmission cycle calculated this time and determining whether or not the difference between the two transmission cycles is within a threshold value, the processing unit 21 can determine whether or not the transmission cycle is valid. The determination regarding whether or not the transmission cycle is correct may be performed by using any method.

If the processing unit 21 determines that the transmission cycle of the received message is a correct transmission cycle (S26: YES), the processing unit 21 performs reception processing of the message (step S27), and performs various processes according to the content of the received message. In addition, the processing unit 21 stores information of the reception time and the delay time for the message received this time (step S28), and ends the process. The reception time and the delay time are stored by using a storage area such as a register inside the storage unit 22 or the processing unit 21.

In addition, if the processing unit 21 determines that the transmission cycle of the received message is not a correct transmission cycle (S26: NO), the processing unit 21 performs processing for discarding the message (step S29), and ends the process. For example, the processing unit 21 does not perform processing using the received message, thereby discarding the message. In addition, in the case of a configuration in which the CAN controller 24 calculates and determines the transmission cycle, the CAN controller 24 may output an error frame to the communication line 4 before the reception of the message determined to have an incorrect transmission cycle is completed, so that it is prevented that the message is received by another ECU 2.

In addition, in this flowchart, a message determined to have an incorrect transmission cycle is treated as an invalid message, but the present disclosure is not limited thereto. For example, a message determined to have an incorrect transmission cycle may be treated as a valid aperiodic message, such as an event message.

Verification Experiment

Figure 8:
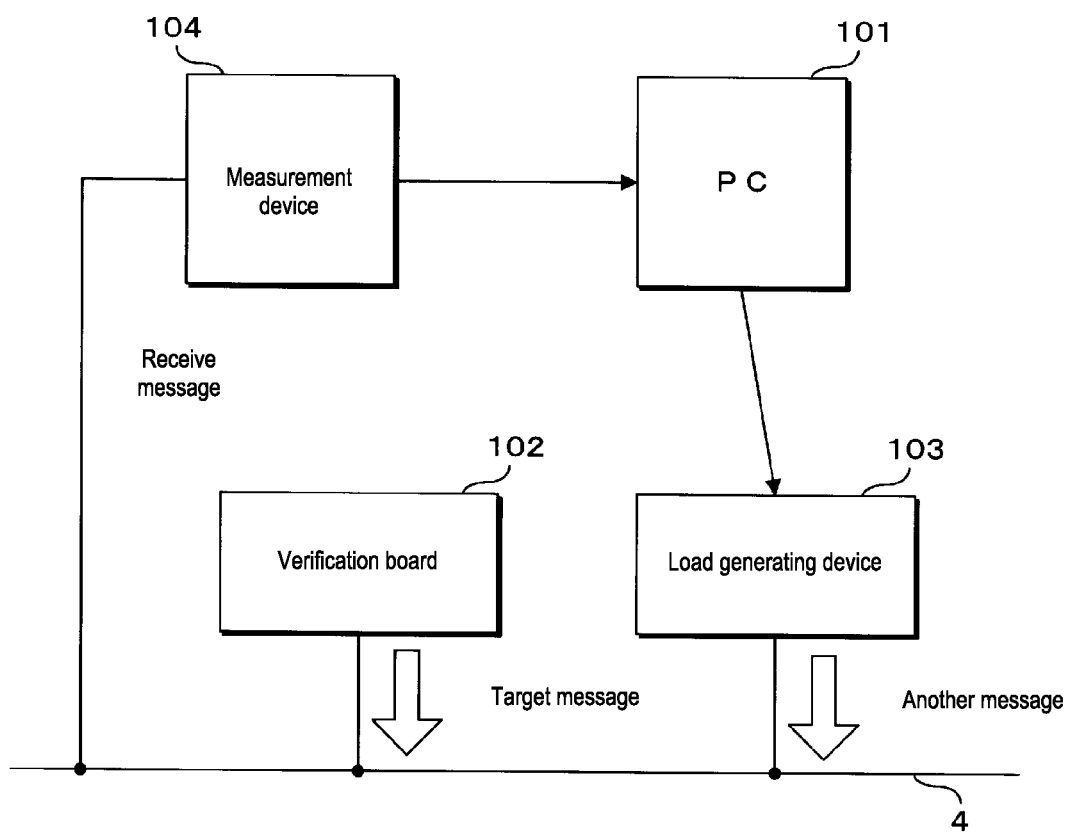
FIG. 8 is a schematic diagram for explaining a method of a verification experiment of the transmission cycle calculation process according to the present embodiment.

FIG. 8 is a schematic diagram for explaining a method of a verification experiment of the transmission cycle calculation process according to the present embodiment. A PC (Personal Computer) 101, a verification board 102, a load generating device 103, and a measurement device 104 are used in the verification experiment of the transmission cycle calculation process according to the present embodiment. The PC 101 is a general-purpose computer, and software for controlling the operation of the load generating device 103, software for acquiring the measurement result of the measurement device 104, and the like are installed. The verification board 102 is an FPGA (Field Programmable Gate Array) in which the functions of the ECU 2 according to the present embodiment are implemented. In this verification, "DE2-115" mounted with the FPGA of ALTERA is used as the verification board 102. The verification board 102 is connected to the communication line 4 corresponding to the CAN bus, and transmits a message to be verified, that is, a message with a delay time at a predetermined cycle.

The load generating device 103 is a device for transmitting a message to obstruct a verification target message transmitted from the verification board 102 to the communication line 4. The message to obstruct a verification target message corresponds to a message transmitted from another ECU 2 to the communication line 4, and is a message that delays the verification target message by arbitration processing. The load generating device 103 is connected to the PC 101, and the frequency of message transmission to the communication line 4 and the like are controlled by the PC 101. In this verification, PEAK System's "PCAN-USB" is used as the load generating device 103.

The measurement device 104 is a device that receives a message transmitted to the communication line 4 and transmits information, such as the content of the received message and the reception time, to the PC 101. In this verification, Vector's "VN1630A" is used as the measurement device 104, and the company's software "CANoe" is operated on the PC 101 to obtain the verification result. The verification board 102 in this verification corresponds to the transmitting side ECU 2 in the in-vehicle communication system according to the present embodiment, and the measurement device 104 and the PC 101 correspond to the ECU 2 on the receiving side. The transmission cycle calculation of the ECU 2 according to the present embodiment is performed by the PC 101 based on the information transmitted from the measurement device 104.

Figure 9:
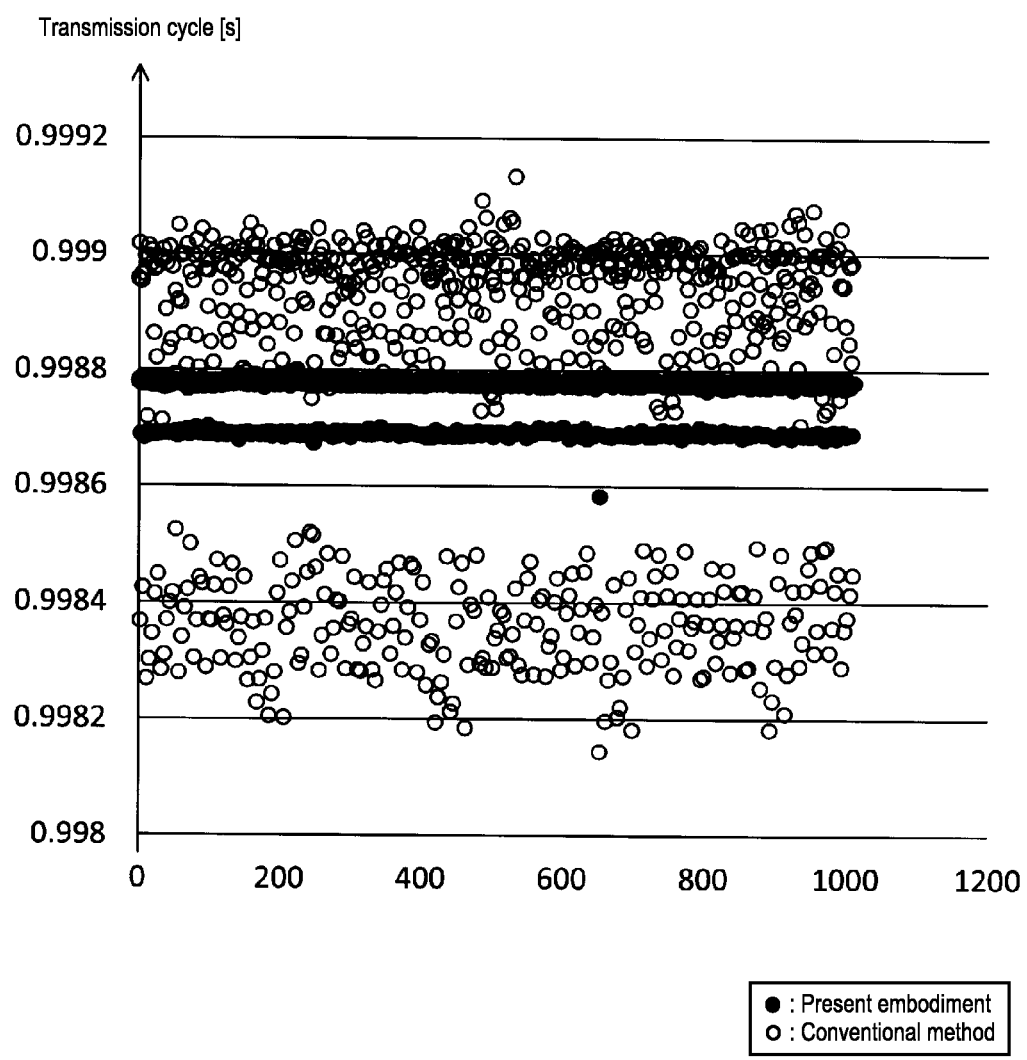
FIG. 9 is a graph showing the results of the verification experiment of the transmission cycle calculation process according to the present embodiment.

FIG. 9 is a graph showing the results of the verification experiment of the transmission cycle calculation process according to the present embodiment. In this verification, periodic message transmission from the verification board 102 was performed 1000 times, and the message was received and the transmission cycle was calculated by the PC 101. In addition, the load generating device 103 transmits a load message so that the occupancy rate of the communication line 4 becomes 50%. The transmission cycle was calculated by using two methods of a transmission cycle calculation method according to the above-described embodiment in which the delay time assigned to the message is used and a conventional method in which the transmission cycle is calculated only by the time difference between reception times without using the delay time. In the graph shown in FIG. 9, the results of the verification experiment are shown with the reception order of received messages on the horizontal axis and the transmission cycle [seconds] calculated based on the received messages on the vertical axis. The calculation result of the transmission cycle by the transmission cycle calculation method according to the present embodiment is shown by black circles on the graph, and the calculation result by the conventional method is shown by white circles on the graph.

According to the results of the verification experiment shown in the diagram, the transmission cycle calculated by this method is concentrated on either 0.9987 or 0.9988, but the transmission cycle calculated by the conventional method varies widely between 0.9982 and 0.9992. In addition, the reason why the result of this method is divided into two transmission cycles is due to the variation in the transmission timing of the message by the verification board 102 used in the verification experiment. The verification board 102 transmits a message at two timings when the transmission cycle is 0.9987 or 0.9988. Therefore, the message transmission cycle calculated by this method has little variation in the calculation result, and the transmission cycle of the transmission source is accurately calculated.

Summary

In the in-vehicle communication system according to the present embodiment having the above-described configuration, a delay time from the point in time when the ECU 2 on the transmitting side first attempts to transmit the message to the point in time when the message is actually transmitted is assigned to the message. The message transmitted from the ECU 2 on the transmitting side is received by the ECU 2 on the receiving side connected to the common communication line 4. The ECU 2 on the receiving side acquires the reception time of the received message, and acquires the delay time assigned to the received message. The ECU 2 on the receiving side acquires the reception time and the delay time for each of the two messages received before and after in chronological order, and calculates the transmission cycle of the message based on the acquired information. Since the ECU 2 on the transmitting side transmits a message with a delay time assigned thereto and the ECU 2 on the receiving side acquires the delay time from the message and calculates the transmission cycle, the ECU 2 on the receiving side can calculate the transmission cycle of the message in consideration of the delay of message transmission due to arbitration processing or the like in the ECU 2 on the transmitting side. Therefore, the ECU 2 on the receiving side can accurately calculate the transmission cycle of the message.

In addition, in the present embodiment, the time that goes back from the reception time of the message by the delay time is the time when the transmission of the message is first attempted, that is, the transmission time of the message. Therefore, the ECU 2 on the receiving side calculates a time difference between the time that goes back by the delay time from the reception time of the message received earlier and the time that goes back by the delay time from the reception time of the message received later, and sets the time difference as a transmission cycle of the message. Since the ECU 2 on the receiving side can calculate the transmission cycle of the message based on the time when the ECU 2 on the transmitting side first attempts to transmit the message, it is possible to accurately calculate the transmission cycle of the message.

In addition, in the present embodiment, based on the calculated transmission cycle of the message, the ECU 2 on the receiving side determines whether the received message has been transmitted periodically at a valid transmission cycle or transmitted aperiodically at an invalid transmission cycle. For example, each time a message is received, the ECU 2 on the receiving side calculates a time difference in transmission time from the message received previously. When the calculated time difference falls within a predetermined range with respect to the previously calculated transmission cycle, it can be determined that the received message is transmitted periodically. On the other hand, when the calculated time difference is a different value exceeding the predetermined range with respect to the transmission cycle, the ECU 2 on the receiving side can determine that the received message is transmitted aperiodically. The message determined to be aperiodic may be, for example, a message transmitted by event driving or an invalid message by an invalid device.

In addition, in the present embodiment, the ECU 2 is configured to transmit and receive a message according to the CAN communication standard, but the present disclosure is not limited thereto. For example, transmission and reception of a message according to the CAN-FD (CAN with Flexible Data rate) communication standard may be performed. In addition, the ECU 2 may be configured to transmit and receive a message according to a communication standard different from the CAN. In addition, in the present embodiment, some or all of the processes performed by the transmission processing unit 24*a* to the transmission cycle calculation unit 21*a* provided in the CAN controller 24 may be performed by the processing unit 21 of the ECU 2. In addition, some or all of the processes shown in the flowchart of FIG. 7 may not be performed by the CAN controller 24, but may be performed by the processing unit 21. In addition, the CAN controller 24 is configured to store the reception time and the delay time of the received message, but may be configured to stores the transmission time of the message calculated based on the reception time and the delay time without being limited to the above.

Second Embodiment

Figure 10:
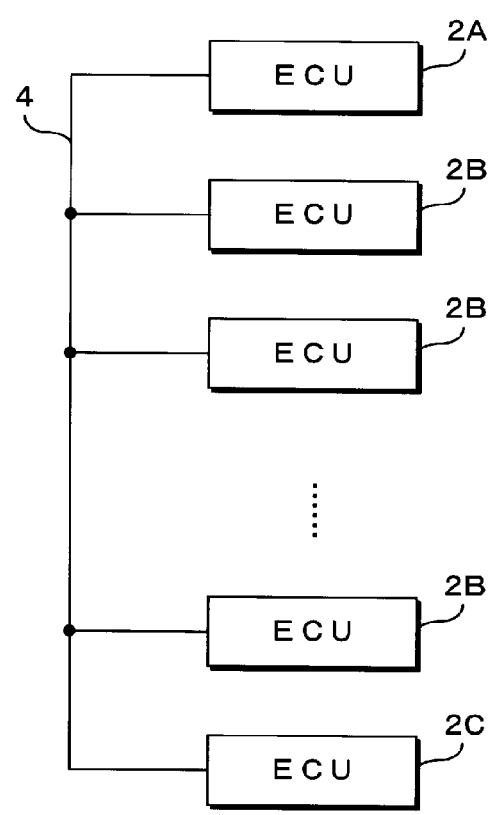
FIG. 10 is a block diagram showing the configuration of an in-vehicle communication system according to a second embodiment.

FIG. 10 is a block diagram showing the configuration of an in-vehicle communication system according to a second embodiment. The in-vehicle communication system according to the second embodiment is a system including an ECU 2A having a function of assigning a delay time to a message, an ECU 2C having a function of calculating a transmission cycle based on the delay time assigned to the message, and an ECU 2B having neither of these functions.

The ECU 2A assigns a delay time to the message transmitted by itself by using the above method. However, the ECU 2A does not perform processing for calculating the transmission cycle for the reception of the message, but only receives the message according to the normal CAN communication standard. The ECU 2B does not perform the above-described processing, such as assigning the delay time and calculating the transmission cycle, and transmits and receives a message according to the normal CAN communication standard. The ECU 2B may treat the message with a delay time assigned thereto, which is transmitted from the ECU 2A, as a message according to the normal CAN communication standard. The ECU 2C performs processing for calculating the transmission cycle using the delay time assigned to the message by using the method described above. However, the ECU 2C does not perform processing for assigning a delay time to the message transmitted by itself.

In the in-vehicle communication system according to the second embodiment, a message with a delay time and a message without a delay time are mixed. Therefore, each time a message is received, the ECU 2C needs to determine whether the message is a message with a delay time or a message without a delay time. The ECU 2C according to the second embodiment stores in advance a table in which a CANID assigned to a message and information indicating whether or not a delay time is assigned to the message are associated with each other. The ECU 2C acquires the CANID of the received message and refers to the table to determine whether or not a delay time is assigned to the message. The ECU 2C performs processing for calculating the transmission cycle for the message to which the delay time is assigned.

In the in-vehicle communication system according to the second embodiment having the above-described configuration, the plurality of ECUs 2 connected to the common communication line 4 include the ECU 2A that transmits a message with a delay time assigned thereto and the ECUs 2B and 2C that transmit a message without assigning a delay time. That is, in the in-vehicle communication system according to the second embodiment, a message with a delay time and a message without a delay time are mixed. Since a function of assigning a delay time only to the ECU 2A, which is required to accurately determine the transmission cycle of a message, may be added to the in-vehicle communication system of CAN having a conventional configuration for transmitting and receiving a message without a delay time assigned thereto, it is possible to easily introduce a configuration for determining a transmission cycle using a delay time into a conventional in-vehicle communication system.

In addition, in the in-vehicle communication system according to the second embodiment, a CANID for identifying a message is assigned to the messages transmitted and received by the ECUs 2A to 2C. The ECU 2C that receives a message can determine whether or not a delay time is assigned to the message based on the CANID of the received message. As a result, even when a message with a delay time and a message without a delay time are mixed, the ECU 2C on the receiving side can calculate the transmission cycle of the message.

In addition, the in-vehicle communication system according to the second embodiment has a configuration in which three types of ECUs 2A to 2C are mixed, but ECUs having other configurations may be further mixed. For example, an ECU having a function of transmitting a message with a delay time assigned thereto and a function of calculating the transmission cycle using the delay time assigned to the message may be further mixed. In addition, a plurality of ECUs similar to the ECUs 2A and 2C may be included in the in-vehicle communication system. In addition, the ECU 2C is configured to determine whether or not a delay time is assigned to the received message by referring to the table stored in advance, but the present disclosure is not limited thereto. For example, information such as a flag indicating the presence or absence of a delay time may be included in the message.

Each device in the in-vehicle communication system includes a computer configured to include a microprocessor, a ROM, a RAM, and the like. An arithmetic processing unit, such as a microprocessor, may read a computer program including a part or all of each step of a sequence diagram or a flowchart shown in FIGS. 4 and 7 from a storage unit, such as a ROM or a RAM, and execute the computer program. Each of the computer programs of the plurality of devices can be installed from an external server device or the like. In addition, each of the computer programs of the plurality of devices is distributed in a state of being stored in a recording medium, such as a CD-ROM, a DVD-ROM, or a semiconductor memory.

It should be considered that the embodiments disclosed are examples in all points and not restrictive. The scope of the present disclosure is defined by the claims rather than the meanings set forth above, and is intended to include all modifications within the scope and meaning equivalent to the claims.

The invention claimed is:

1. An in-vehicle communication system in which a plurality of in-vehicle communication devices connected to a common communication line transmit and receive a plurality of messages through the communication line,
wherein the in-vehicle communication device of the plurality of in-vehicle communication devices on a transmitting side of the messages includes:
a delay time measuring unit that measures a delay time from a first point in time when transmission of the message to be transmitted is first attempted to a point in time when the transmission of the message is started; and
an assigning unit that assigns the delay time measured by the delay time measuring unit to one message of the plurality of messages, and
the in-vehicle communication device of the plurality of in-vehicle communication devices on a receiving side of the plurality of messages includes:
a reception point acquisition unit that acquires a second point in time when the one message from the in-vehicle communication device on the transmitting side is received;
a delay time acquisition unit that acquires a delay time assigned to the received one message, the delay time being a difference between the first point in time and a point in time when the message is actually transmitted; and
a calculation unit that calculates a transmission cycle of the one message based on the second point in time acquired by the reception point acquisition unit and the delay time acquired by the delay time acquisition unit and calculates a time difference between the transmission times of two consecutive received messages in chronological order to update the transmission cycle of a subsequent message.

2. The in-vehicle communication system according to claim 1, wherein the in-vehicle communication device on the receiving side includes a periodic message determination unit that determines whether the received message is a periodically transmitted message or an aperiodically transmitted message based on the transmission cycle calculated by the calculation unit.

3. The in-vehicle communication system according to claim 2, wherein one of the plurality of in-vehicle communication devices includes the delay time measuring unit and the assigning unit and wherein another one of the plurality of in-vehicle communication device that does not include the delay time measuring unit and the assigning unit.

4. The in-vehicle communication system according to claim 1, wherein one of the plurality of in-vehicle communication devices includes an in-vehicle communication device that has the delay time measuring unit and the assigning unit and the other one of the plurality of in-vehicle communication devices does not have the delay time measuring unit and the assigning unit.

5. The in-vehicle communication system according to claim 4, wherein identification information for identifying the message is added to the message, and the in-vehicle communication device on the receiving side includes an assignment determination unit that determines whether or not the delay time is assigned to the message based on identification information added to the received message.

6. The in-vehicle communication system according to claim 1, wherein one of the plurality of in-vehicle communication devices includes the delay time measuring unit and the assigning unit and wherein another one of the plurality of in-vehicle communication device that does not include the delay time measuring unit and the assigning unit.

7. An in-vehicle communication device that is connected to a common communication line together with other in-vehicle communication devices and transmits and receives a message through the communication line, comprising:
- a reception unit that receives the message with a delay time from a point in time when transmission of the message to be transmitted is first attempted to the point in time when the transmission of the message is started;
- a reception point acquisition unit that acquires a point in time when the reception unit receives the message;
- a delay time acquisition unit that acquires the delay time assigned to the received message; and
- a calculation unit that calculates a transmission cycle of each message based on a point in time acquired by the reception point acquisition unit and a delay time acquired by the delay time acquisition unit for each of two consecutive received messages and calculates a time difference between the transmission times of the two consecutive received messages in chronological order to update the transmission cycle of a subsequent message.

8. A transmission cycle calculation method for calculating a transmission cycle of each message transmitted and received through a common communication line by a plurality of in-vehicle communication devices connected to the common communication line, comprising:
- measuring a delay time from a point in time when transmission of the message to be transmitted is first attempted to the point in time when the transmission of the message is started and assigning the measured delay time to the message by an in-vehicle communication device on a transmitting side of the message; and
- acquiring a point in time when the message from the in-vehicle communication device on the transmitting side is received, acquiring the delay time assigned to the received message, and calculating a transmission cycle of each message based on the point in time and the delay time acquired for each of two consecutive received messages by an in-vehicle communication device on a receiving side of the message and calculates a time difference between the transmission times of the two consecutive received messages in chronological order to update the transmission cycle of a subsequent message.

* * * * *